(12) United States Patent
Ehrenberg et al.

(10) Patent No.: US 11,772,028 B2
(45) Date of Patent: Oct. 3, 2023

(54) RADIAL SEAL FILTER

(71) Applicant: THE SY-KLONE COMPANY, LLC, Jacksonville, FL (US)

(72) Inventors: Eric L. Ehrenberg, Jacksonville, FL (US); James G. Moredock, Elkton, FL (US)

(73) Assignee: THE SY-KLONE COMPANY, LLC, Jacksonville, FL (US)

( * ) Notice: Subject to any disclaimer, the term of this patent is extended or adjusted under 35 U.S.C. 154(b) by 220 days.

(21) Appl. No.: 17/138,052

(22) Filed: Dec. 30, 2020

(65) Prior Publication Data
US 2021/0370215 A1 Dec. 2, 2021

Related U.S. Application Data

(60) Provisional application No. 63/032,827, filed on Jun. 1, 2020.

(51) Int. Cl.
B01D 46/04 (2006.01)
B01D 46/00 (2022.01)
B01D 46/24 (2006.01)

(52) U.S. Cl.
CPC ....... *B01D 46/2414* (2013.01); *B01D 46/009* (2013.01); *B01D 2201/52* (2013.01); *B01D 2265/06* (2013.01); *B01D 2271/027* (2013.01)

(58) Field of Classification Search
CPC ............ B01D 46/2411; B01D 46/2414; B01D 2265/06; B01D 2271/027; B01D 2201/52; B01D 46/009
See application file for complete search history.

(56) References Cited

U.S. PATENT DOCUMENTS

| | | |
|---|---|---|
| D306,640 S | 3/1990 | Kott |
| 5,211,846 A | 5/1993 | Kott et al. |
| D403,740 S | 1/1999 | Kott et al. |
| 5,954,849 A | 9/1999 | Berkhoel et al. |
| 6,447,567 B1 | 9/2002 | Ehrenberg |
| D638,034 S | 5/2011 | Jiang et al. |
| D691,252 S | 10/2013 | Moredock et al. |
| 8,945,282 B2 | 2/2015 | Moredock et al. |
| D767,746 S | 9/2016 | Moredock et al. |
| D768,277 S | 10/2016 | Moredock et al. |
| D773,014 S | 11/2016 | Pale |

(Continued)

FOREIGN PATENT DOCUMENTS

| | | |
|---|---|---|
| CN | 205287916 U | 6/2016 |
| DE | 2824280 A1 | 12/1978 |

(Continued)

OTHER PUBLICATIONS

Jul. 15, 2022 Search Report issued in Chinese Patent Application No. 202110483726.5.

(Continued)

Primary Examiner — Robert Clemente
(74) Attorney, Agent, or Firm — Oliff PLC

(57) ABSTRACT

An air filter includes a filter media, an end cap, a urethane outlet air seal, and a screen assembly. The end cap is secured to a first end of the filter media. The urethane outlet air seal is secured to a second, opposite end of the filter media. The screen assembly is secured to a central portion of the filter media between the first and second ends.

22 Claims, 14 Drawing Sheets

(56) References Cited

U.S. PATENT DOCUMENTS

| | | | |
|---|---|---|---|
| 9,700,828 | B2 | 7/2017 | Moredock et al. |
| D849,899 | S | 5/2019 | Bryant et al. |
| D855,755 | S | 8/2019 | Coelho et al. |
| D885,519 | S | 5/2020 | Suzuki et al. |
| 10,850,222 | B2 | 12/2020 | Moredock et al. |
| D913,417 | S | 3/2021 | Huaping |
| D916,238 | S | 4/2021 | Coelho et al. |
| D967,370 | S | 10/2022 | Han et al. |
| 11,486,339 | B2* | 11/2022 | Lejestrand ......... F02M 35/0201 |
| 2004/0124129 | A1 | 7/2004 | Booth |
| 2010/0051537 | A1 | 3/2010 | Amesoeder et al. |
| 2010/0146920 | A1 | 6/2010 | Iddings et al. |
| 2010/0243554 | A1 | 9/2010 | Herrin et al. |
| 2010/0263339 | A1* | 10/2010 | Steins ............... B01D 46/2414 55/498 |
| 2011/0168647 | A1 | 7/2011 | Wieczorek et al. |
| 2012/0080372 | A1 | 4/2012 | Ries et al. |
| 2014/0102058 | A1* | 4/2014 | Kaufmann ............ B01D 46/62 55/482 |
| 2014/0224129 | A1* | 8/2014 | Kaufmann ............ F02M 35/08 96/414 |
| 2014/0260982 | A1 | 9/2014 | Williams et al. |
| 2015/0113931 | A1* | 4/2015 | Bartel ............... B01D 46/2411 55/498 |
| 2018/0036667 | A1* | 2/2018 | Neef ................. B01D 46/2414 |
| 2018/0112429 | A1 | 4/2018 | Coelho et al. |
| 2018/0264382 | A1 | 9/2018 | Dani et al. |
| 2019/0054410 | A1 | 2/2019 | Tanaka |
| 2019/0060814 | A1* | 2/2019 | Donauer ......... F02M 35/02441 |
| 2019/0060815 | A1 | 2/2019 | Movia et al. |
| 2019/0070549 | A1* | 3/2019 | Fritzsching ........ B01D 46/2414 |
| 2020/0023296 | A1 | 1/2020 | Stark et al. |

FOREIGN PATENT DOCUMENTS

| | | |
|---|---|---|
| DE | 19547664 A1 | 6/1997 |
| DE | 102007017091 A1 | 10/2008 |
| DE | 102014009323 A1 | 12/2015 |
| JP | 2014-529483 A | 11/2014 |
| WO | 2013/019364 A1 | 2/2013 |

OTHER PUBLICATIONS

Jul. 21, 2022 Office Action issued in Chinese Patent Application No. 202110483726.5.

Dec. 15, 2021 Extended Search Report issued in European Patent Application No. 21171390.4.

Oct. 4, 2021 Partial Search Report issued in European Patent Application No. 21171390.4.

Nov. 1, 2022 Office Action issued in Japanese Patent Application No. 2021-076353.

Culligan Water Filter, Sep. 20, 2004, Amazon.com, Apr. 20, 2021. URL: https://www.amazon.com/Culligan-R50-BBSA-Sediment-Replacement-Cartridge/dp/B000BQWYDO (Year: 2004).

Teir1 Water Spa filtration. Jun. 5, 2018, Amazon.com, Apr. 21, 2021. URL: https://www.amazon.com/dp/B00FWOUC9W (Year: 2018).

Guardian Filtration Antimicrobal, Jul. 11, 2019, Amazon.com, Apr. 21, 2021. URL: https://www.amazon.com/dp/B01L9M3VRG (Year: 2019).

Dodge Ram 6.7 Liter Diesel Fuel Filter Water Separator Set, Dec. 31, 2016, amazon.ca, Jan. 13, 2023, URL: https://www.amazon.ca/Dodge-Liter-Diesel-Filter-Separator/dp/B01MF70UW8/ (Year: 2016).

Notonmek New Filter Set Filters, Nov. 30, 2020, amazon.ca, Jan. 13, 2023, URL: https://www.amazon.ca/Notonmek-SB190-SB210-SB230-SB330/dp/B08PB5GBSJ/ (Year: 2020).

Feb. 3, 2023 Notice of Allowance Issued In U.S. Appl. No. 29/797,339.

Feb. 8, 2023 Notice of Allowance Issued In U.S. Appl. No. 29/797,345.

Feb. 14, 2023 Notice of Allowance Issued In U.S. Appl. No. 29/797,382.

Feb. 21, 2023 Notice of Allowance Issued In U.S. Appl. No. 29/797,348.

Feb. 8, 2023 Notice of Allowance Issued In U.S. Appl. No. 29/797,378.

Feb. 15, 2023 Notice of Allowance Issued In U.S. Appl. No. 29/797,376.

Sep. 26, 2022 Office Action issued in Australian Patent Application No. 2021202580.

* cited by examiner

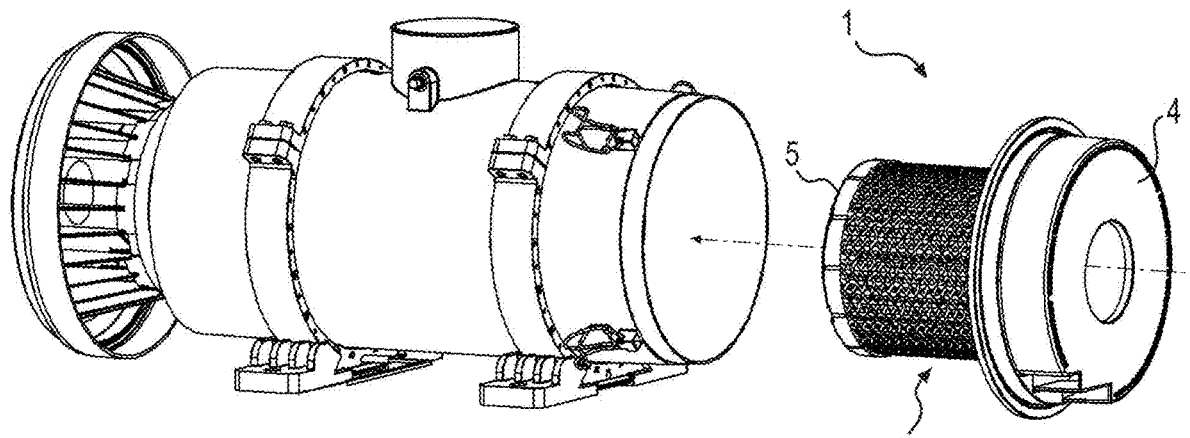
FIG. 4
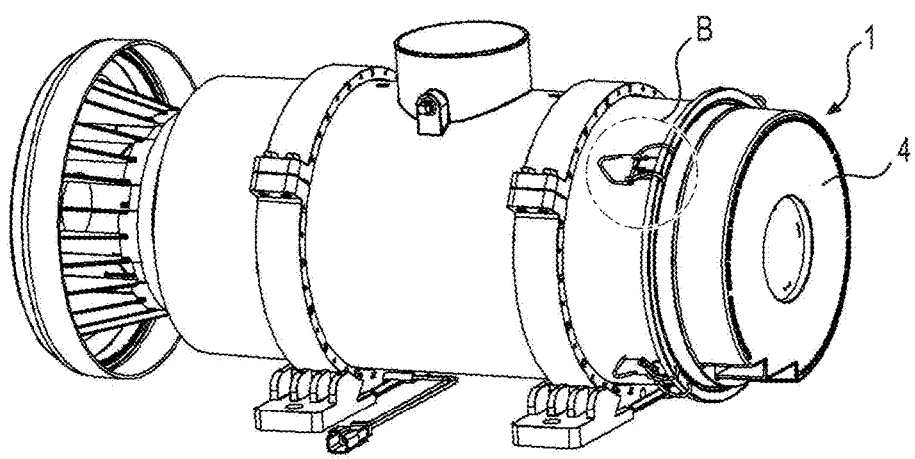
FIG. 5A
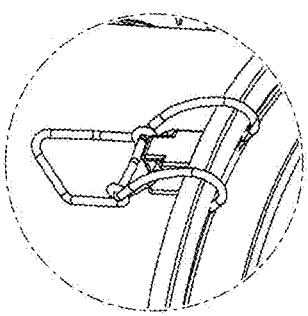 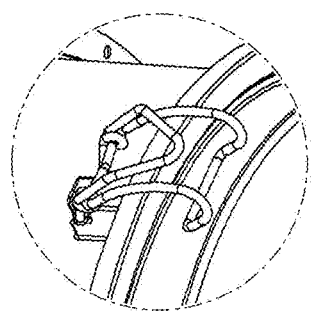 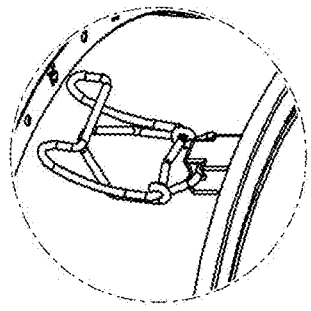
FIG. 5B      FIG. 5C      FIG. 5D

RADIAL SEAL FILTER

This application claims the benefit of priority from Provisional Application No. 63/032,827 filed Jun. 1, 2020, the entire contents of the prior application being incorporated herein by reference.

BACKGROUND

The present disclosure relates to an air filter. The disclosed filter provides a range of advantageous effects which include filter integrity, filter durability, self-cleaning performance, filter seal effectiveness, filter alignment within the filter housing, alignment of an optional filter identification ring and enhanced recyclability.

The present disclosure relates to a filter design that resolves many issues that negatively affect the manufacture and performance of previous designs.

Manufacturing problems with traditional filter designs include: (i) filter media and filter protective screens being not consistently perpendicular; (ii) a urethane seal being applied with a heat process that produces inconsistencies in the filter seal surface, which affect its function; (iii) irregularities in the filter screen circularity coupled with sharp metal edges, where the screen material is punched, cut, and/or welded during manufacture, and the lack of filter screen perpendicularity, resulting in damage to the filter media during the construction of the filter as well as when the filter media comes into vibratory contact with the screen while in use; (iv) the opacity of the screen material, reducing the area through which the particles can drop from the particle shedding media, compromising the ability of the media to self-clean; (v) irregular placement of a filter identification ring (FIR), if included; (vi) corrosion and vibration resulting in damage to the filter media; and (vii) the ability for debris to be continuously and efficiently released from the filter media. The advanced filter of this application resolves each of these issues in filter manufacture and use.

Performance—Filters provide a means to arrest particles from an airflow. Filter effectiveness is determined by the capability of the filter media to stop as many particles present in the airflow as possible. Manufacturing processes, which cause or allow the filter media to become damaged, compromise the filter's effectiveness in arresting particles. To the greatest extent possible, the design of the device that holds the filter media in place should allow for the placement of the media into the holding device without causing damage to the media structural integrity and should also protect the media from damage during and after the manufacturing process. The design of the device that holds the filter media should also allow for consistent placement of a filter identification ring or, alternatively, a label affixed to the filter or an encrypted bar code affixed to the filter or an apparatus of a different shape or size that can be sealed within the urethane outlet air seal, for the purpose of filter identification, if one is desired.

SUMMARY

The exemplary embodiments of the broad inventive principles described herein address the aforementioned problems. Features of the embodiments can be understood with reference to the air precleaners and methods disclosed in commonly owned U.S. Pat. No. 8,945,282 issued Feb. 3, 2015, and U.S. Pat. No. 9,700,828 issued on Jul. 11, 2017, and these patents are incorporated herein by reference in their entirety. The filters disclosed herein can be used with the air precleaners described in the aforementioned patents, as well as in the RESPA® recirculation filtration systems. When equipped with the embedded filter identification ring (or alternatively, a label affixed to the filter or an encrypted bar code affixed to the filter or other apparatus of another shape or size that can be sealed within the urethane outlet seal for the purposes of filter identification), the filter disclosed herein records data and sends filter performance data to a RESPA® Control Module (RCM) monitoring device. The features of the filter identification ring (FIR) and the RCM are described in detail in U.S. application Ser. No. 16/022,941, filed Jun. 29, 2018 (now U.S. Pat. No. 10,850,222, issued Dec. 1, 2020), and incorporated herein by reference in its entirety. Filter performance data may include filter part number, filter rating, filter serial number, filter manufacturing information, and filter usage hours. The following disclosure is not limited to the filter being used in a specific enclosure. Different applications and housings can be designed for different environments for which the following disclosure is applicable. Applications may include engine air intake systems; heating, ventilation and cooling systems; and other applications where filtered air is required. The following disclosure applies to filters referenced in U.S. Design Pat. No. D768,277 issued Oct. 4, 2016, U.S. Design Pat. No. D767,746 issued Sep. 27, 2016, and U.S. Design Pat. No. D691,252 issued on Oct. 8, 2013, which, in each case, form the inner barrier and particle ejection for the separator chamber of a powered self-cleaning system, and these patents are incorporated herein by reference in their entirety. The disclosure also applies to filters used in non-powered air filtration systems.

As will be described in detail below, the filter of this application resolves each of the problems discussed above in filter manufacture and use. More specifically, the structure of the filter ensures that the filter identification ring (FIR), if desired, is installed at the proper position, that the filter media is held securely and protected from impact with the screen, vibration and corrosion, and that debris is continuously released from the filter media in an efficient manner.

BRIEF DESCRIPTION OF THE DRAWINGS

FIG. 4 is a view illustrating the filter positioned for insertion into the filter housing.

FIGS. 5A to 5D are views illustrating the filter after insertion into the filter housing with close-up views of the locking mechanism between the filter and the filter housing.

DETAILED DESCRIPTION OF EMBODIMENTS

The air filter 1, optionally including the embedded filter identification ring (FIR) 2, according to the exemplary embodiments disclosed herein is described below in detail.

Figure 1:
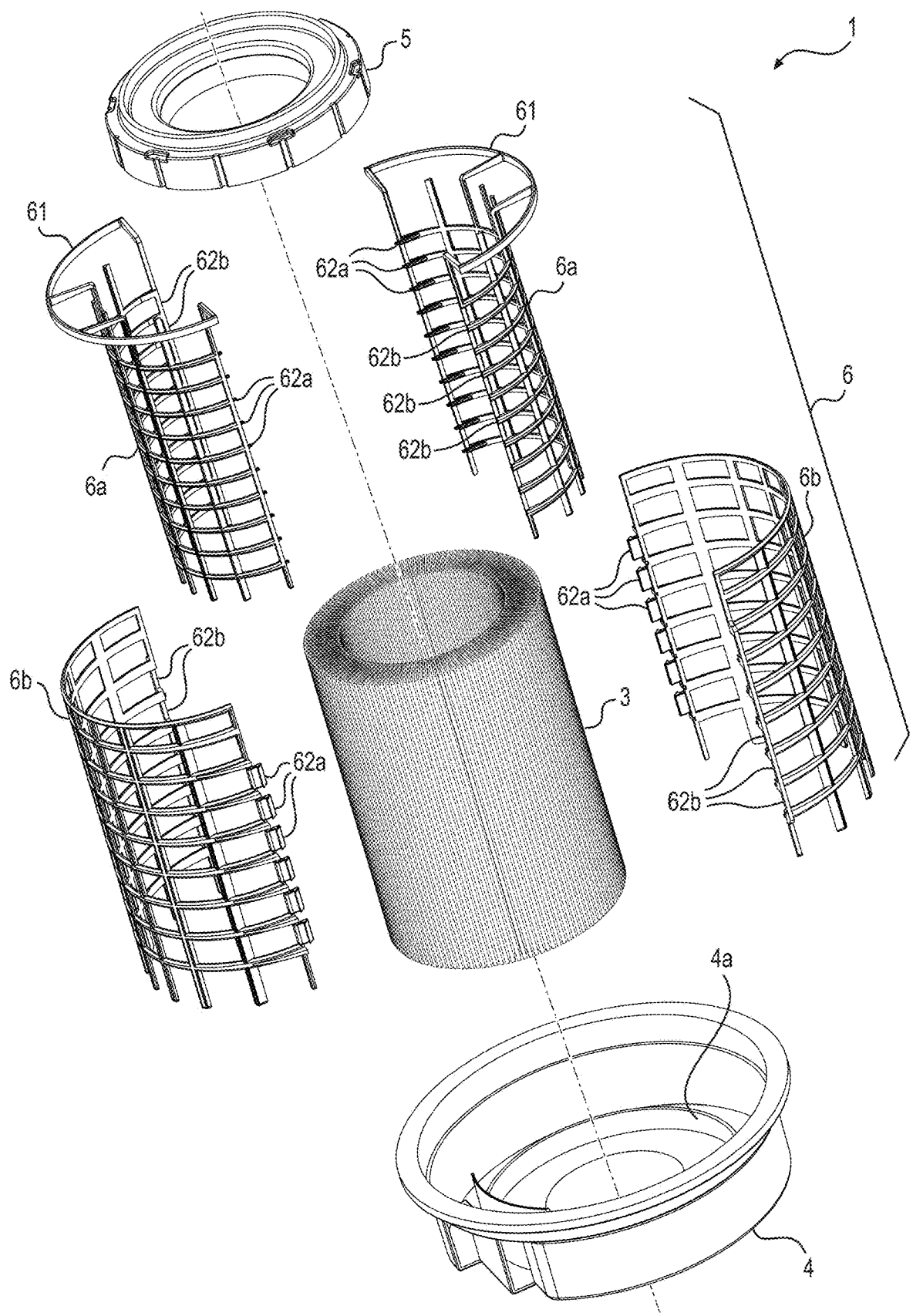
FIG. 1 is a top exploded view illustrating diagrammatically the parts of the filter.
Figure 2:
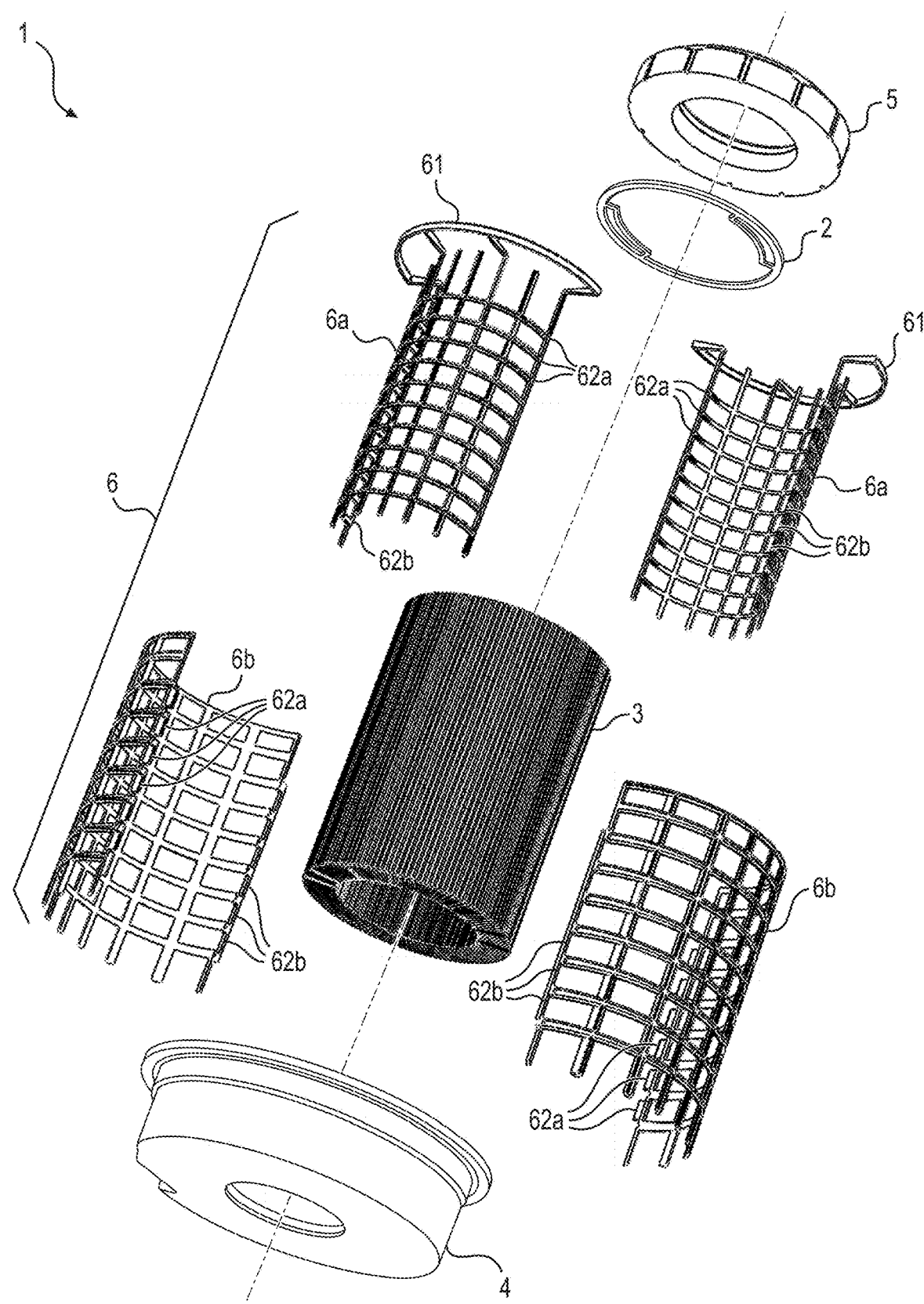
FIG. 2 is a bottom exploded view illustrating diagrammatically the parts of the filter.
Figure 8:
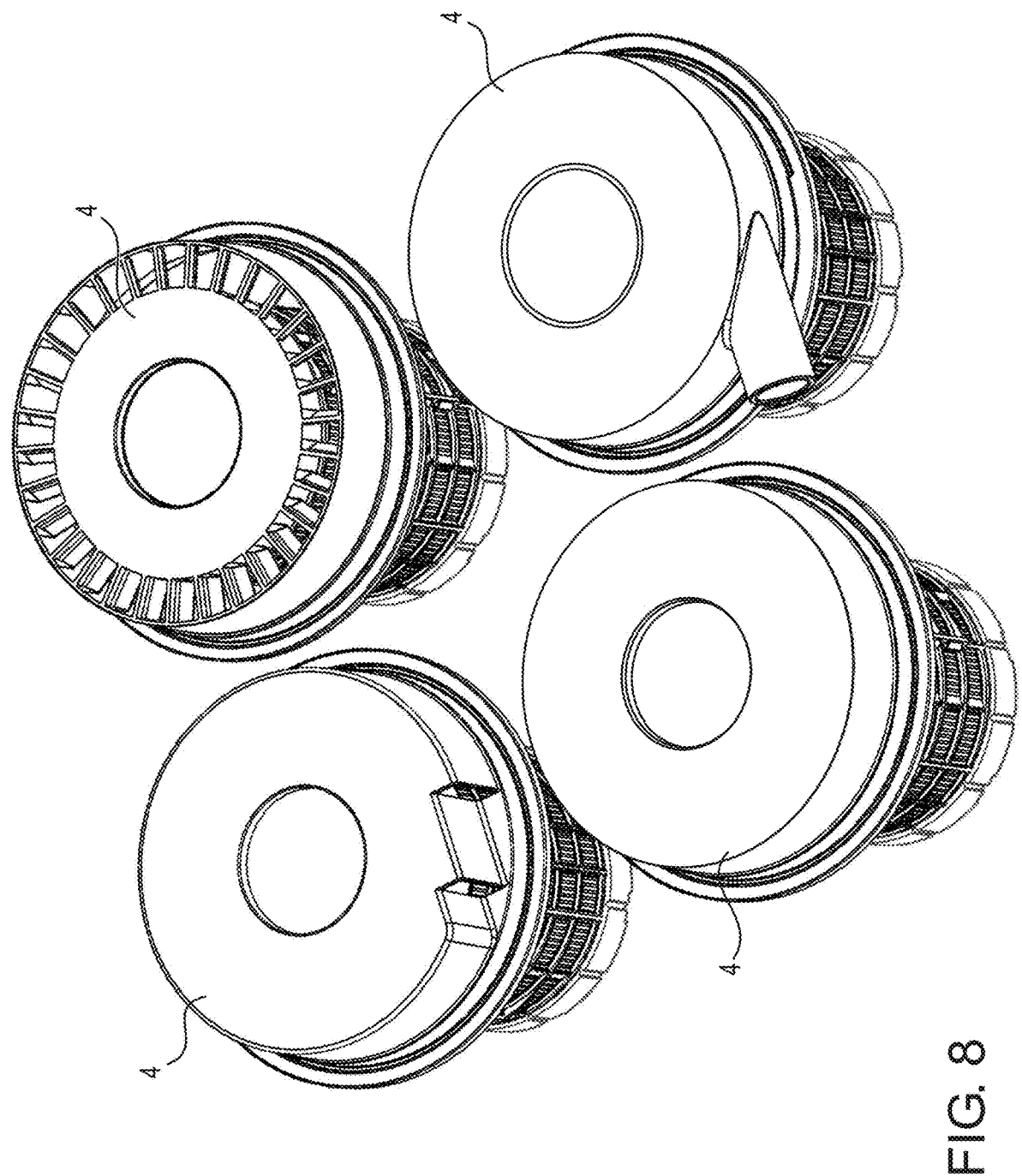
FIG. 8 is a view illustrating different types of end caps.

As shown in FIGS. 1 and 2, the air filter 1, with an embedded FIR 2 (visible in FIGS. 2 and 9) according to one embodiment, includes a filter media 3, a plastic end cap 4, a urethane outlet air seal 5 (e.g., a cold-poured urethane outlet air seal), which can be manufactured with or without the FIR 2 molded into the urethane, and a plastic molded screen assembly 6. The screen assembly 6 includes a two-part inner plastic screen 6a and a two-part outer plastic screen 6b. As understood from the figures, the inner plastic screen 6a is positioned on the inside of the filter media 3 (except for a circular lip 61 discussed below, which extends outward from the filter media 3), while the outer plastic screen 6b is positioned on the outside of the filter media 3. The inner plastic screen 6a, on the outlet air side, is encased in the urethane outlet air seal 5 and, on the non-outlet air side, is glued into the filter end cap 4. The filter media 3 (which varies for different filter applications) is also encased by the urethane on the outlet air side and, on the non-outlet air side, glued into the filter end cap 4. The outer plastic screen 6b is likewise encased within the urethane outlet air seal 5 and, on the non-outlet air side, glued into the filter end cap 4. The plastic end cap 4, which can be one of various designs, as shown in FIG. 8, is attached to the filter media 3 and the screen assembly 6 through the use of glue. FIG. 8 shows currently available filter end cap designs. However, the filter end caps are not limited to these embodiments and may be designed with modifications for specific applications based on future requirements.

FIG. 1 shows one exemplary embodiment of the exploded view of the parts that make up the design of the filter 1. FIG. 2 shows one exemplary embodiment of the exploded view of the parts including the optional FIR 2 that is embedded between the end of the filter media 3 and a circular lip 61 created on the urethane seal outlet air side of the two-part inner plastic screen 6a of the screen assembly 6, and then molded into the urethane outlet air seal 5, as will be described with reference to FIG. 9.

Figure 9:
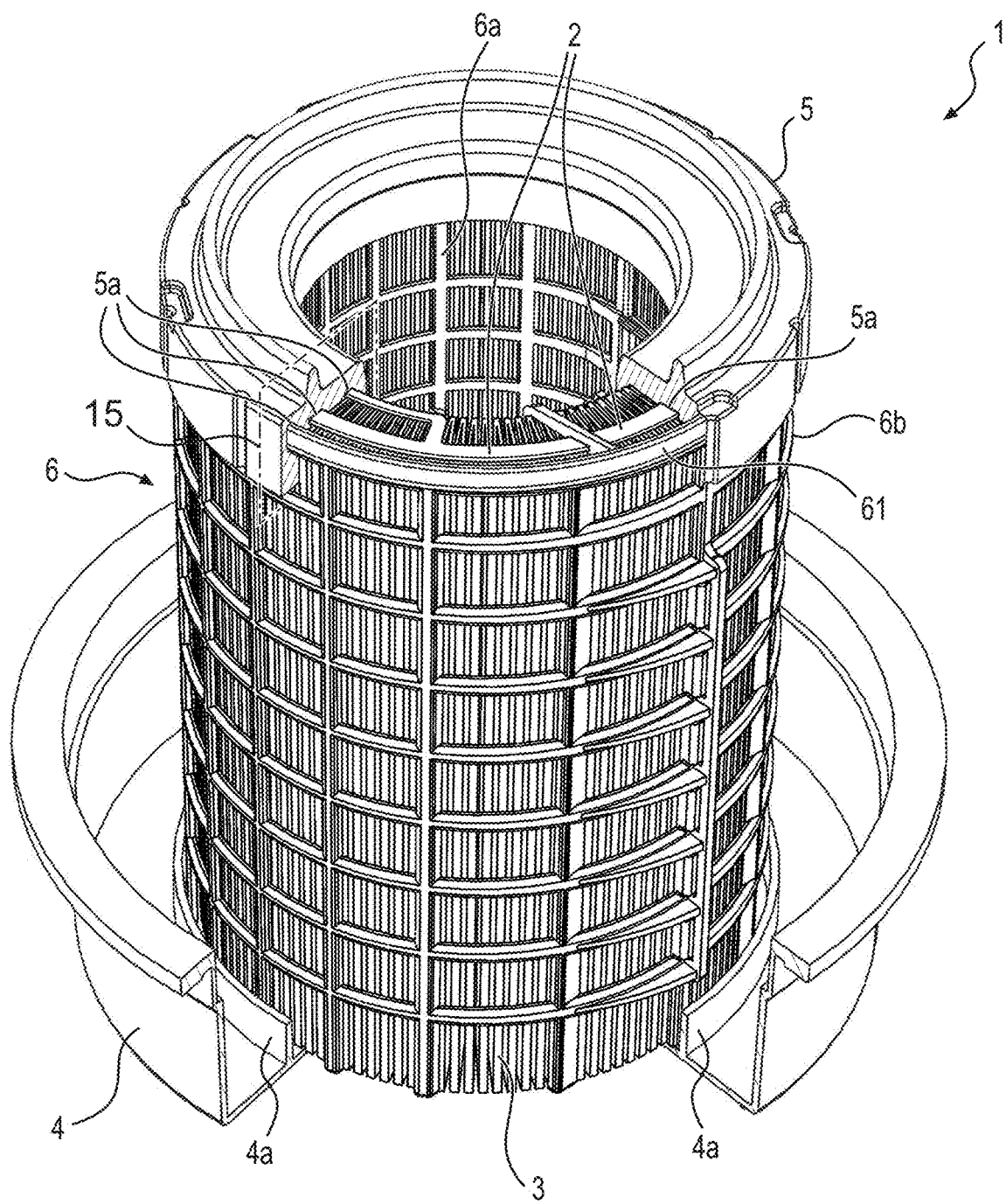
FIG. 9 is a partial cross-sectional view illustrating elements of the filter.

FIG. 9 shows the location of the FIR 2 within the urethane outlet air seal 5. The FIR 2, as shown in FIGS. 2 and 9, has a specified diameter to fit into the space provided between the filter media 3 and the lip 61 of the two-part inner plastic screen 6a, and is sealed within the urethane outlet air seal 5. The circular configuration allows the filter to be placed in the filter housing, which can then be mounted in any orientation and still achieve the same level of functionality. The FIR 2 is configured to communicate with the RCM as described above and in U.S. application Ser. No. 16/022,941. It should be noted that, in addition to the FIR described in U.S. application Ser. No. 16/022,941, the filter identification apparatus may be, alternatively, a label affixed to the filter, an encrypted bar code affixed to the filter, or an apparatus of another shape or size that can be sealed within the urethane outlet air seal 5.

The urethane outlet air seal 5 is a radial seal design manufactured using cold-poured urethane to reduce air bubbles on the sealing surface to ensure proper sealing to the clean-air inlet on the self-cleaning filtration system or air filter housing in all operating environments. As shown in FIGS. 2, 9, 10, 11 and 12, the urethane outlet air radial seal 5 secures the two assembled halves of the inner and outer plastic screens 6a and 6b, respectively and in combination, the filter media 3, and the FIR 2.

Figure 10:
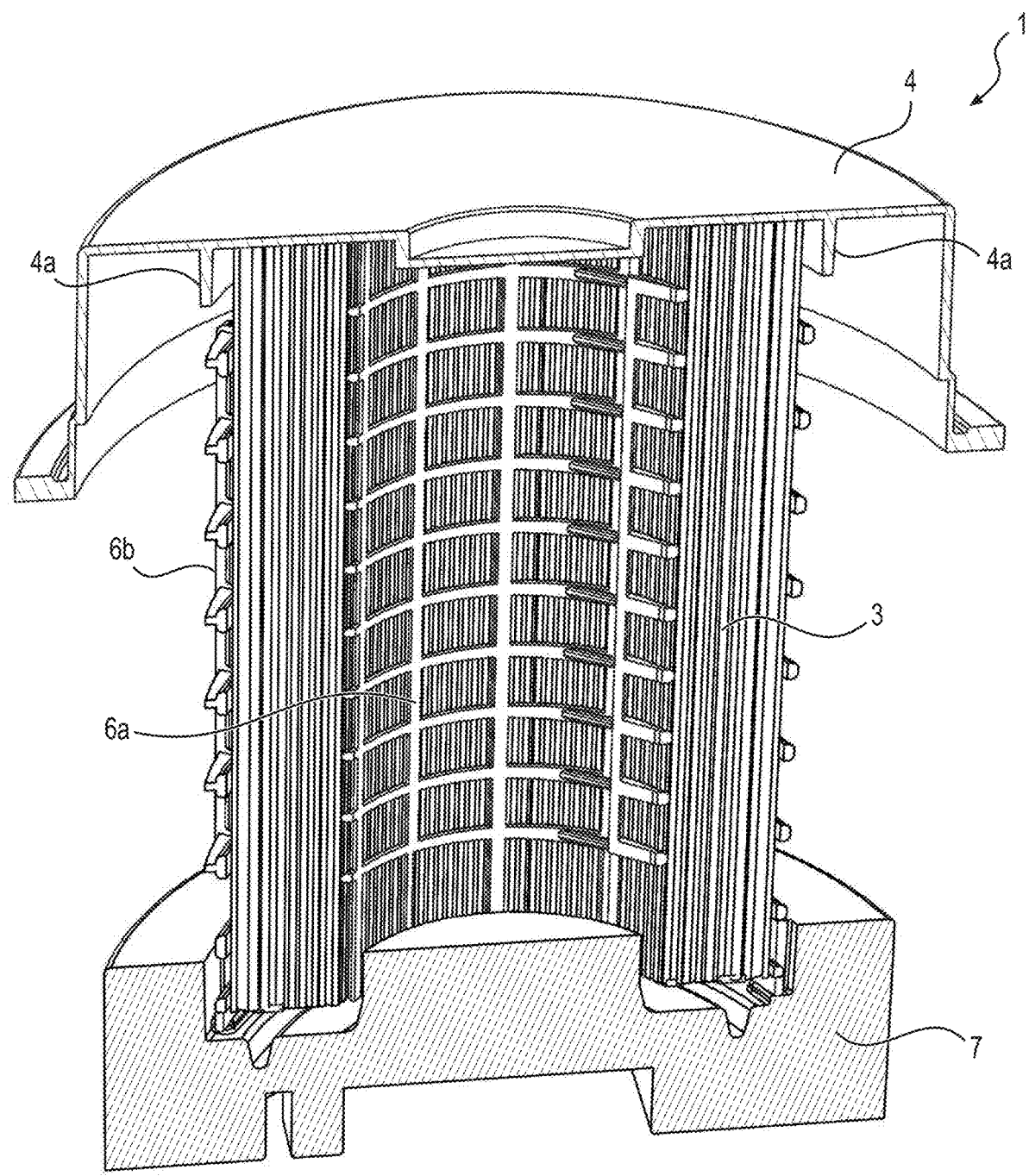
FIG. 10 is a cross-sectional view illustrating the filter installed in a mold during the manufacturing process.

More specifically, FIGS. 9 and 10 show the urethane seal 5 (at the cutout portion) having recesses/grooves 5a on its inner surface where it attaches to (receives) the screen assembly 6 and the FIR 2. As noted above, the urethane seal 5 is formed using cold-poured urethane. As a result, during manufacturing, the urethane flows around the circular lip 61 formed by the two assembled halves of the inner plastic screen 6a (described in greater detail below) and around the FIR 2, such that the resulting structure advantageously tightly bonds the urethane seal 5 to the screen assembly 6, the media 3, and the FIR 2, as shown in FIG. 9.

Figure 15:
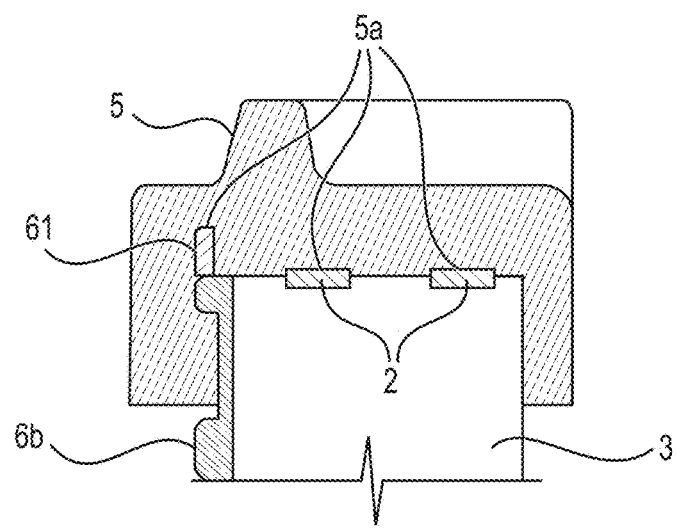
FIG. 15 is a cross-sectional view of the area indicated as "15" in FIG. 9.

FIG. 15 is a cross-sectional view of the area indicated as "15" in FIG. 9. As shown in FIG. 15, the recesses/grooves 5a of the urethane seal 5 receive the FIR 2 and the circular lip 61 formed by the two assembled halves of the inner plastic screen 6a. The cross-section in FIG. 15 shows the screen assembly 6, the filter media 3, and the FIR 2 embedded in the urethane seal 5. The circular lip 61 is embedded in the urethane seal 5 at a position radially outward of positions at which the FIR 2 is embedded in the urethane seal, relative to a longitudinal axis of the air filter 1 (i.e., a longitudinal axis of the filter media 3). For purposes of illustration, FIG. 15 does not show the details of the filter media 3 and the parts of the inner screen 6a positioned inside the filter media 3.

Figure 16A:
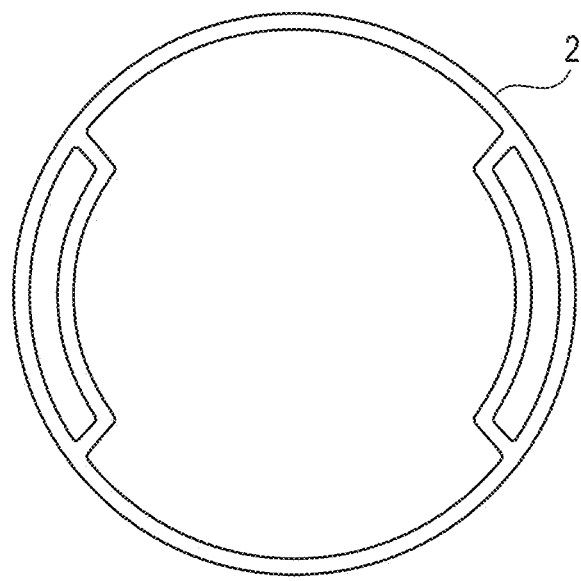
FIGS. 16A and 16B are, respectively, top and perspective views of the filter identification ring.
Figure 16B:
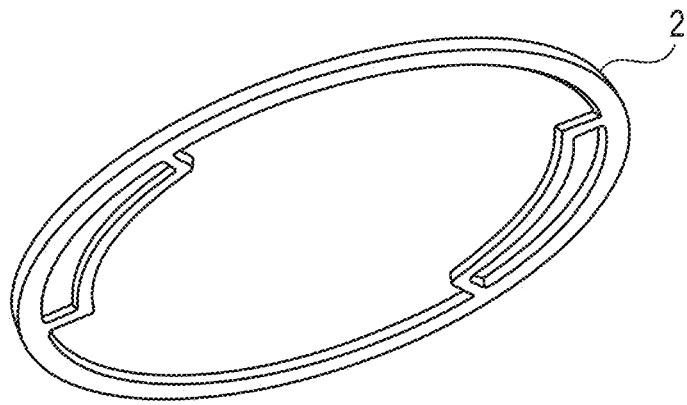

The FIR 2 is shown in greater detail in FIGS. 16A and 16B. The FIR 2 is a circular element having two projecting portions. The two projecting portions project radially inward from the outer circle of the FIR 2. The two projecting portions are symmetrically positioned opposite each other on the FIR 2. However, as noted above, the filter identification apparatus may have various configurations. Some of the possible configurations are shown in FIGS. 24 to 30 of U.S. application Ser. No. 16/022,941 (which, again, is incorporated by reference in its entirety in this disclosure).

Figure 11:
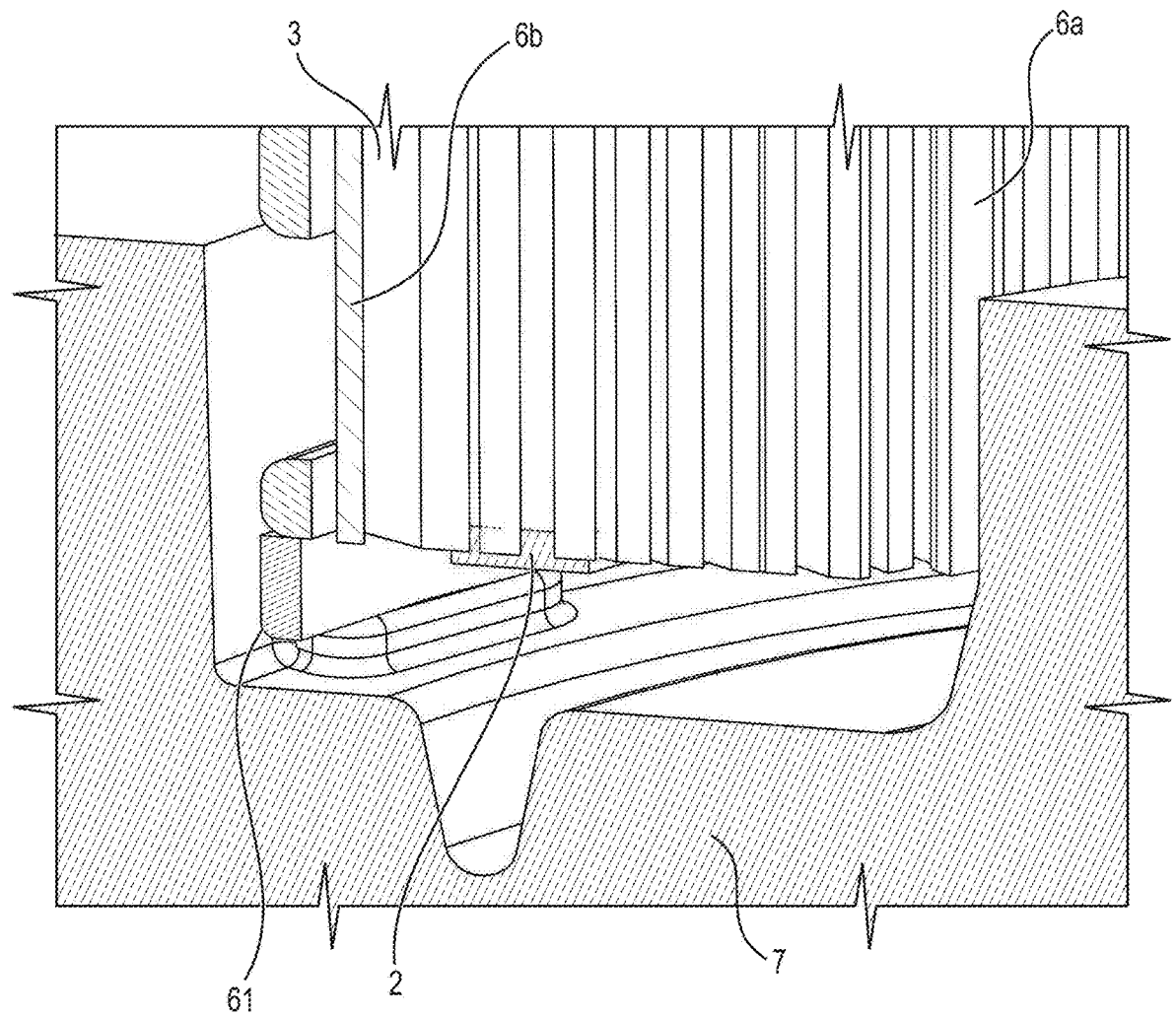
FIG. 11 is a close-up view of FIG. 10 illustrating the filter installed in the mold during the manufacturing process.
Figure 12:
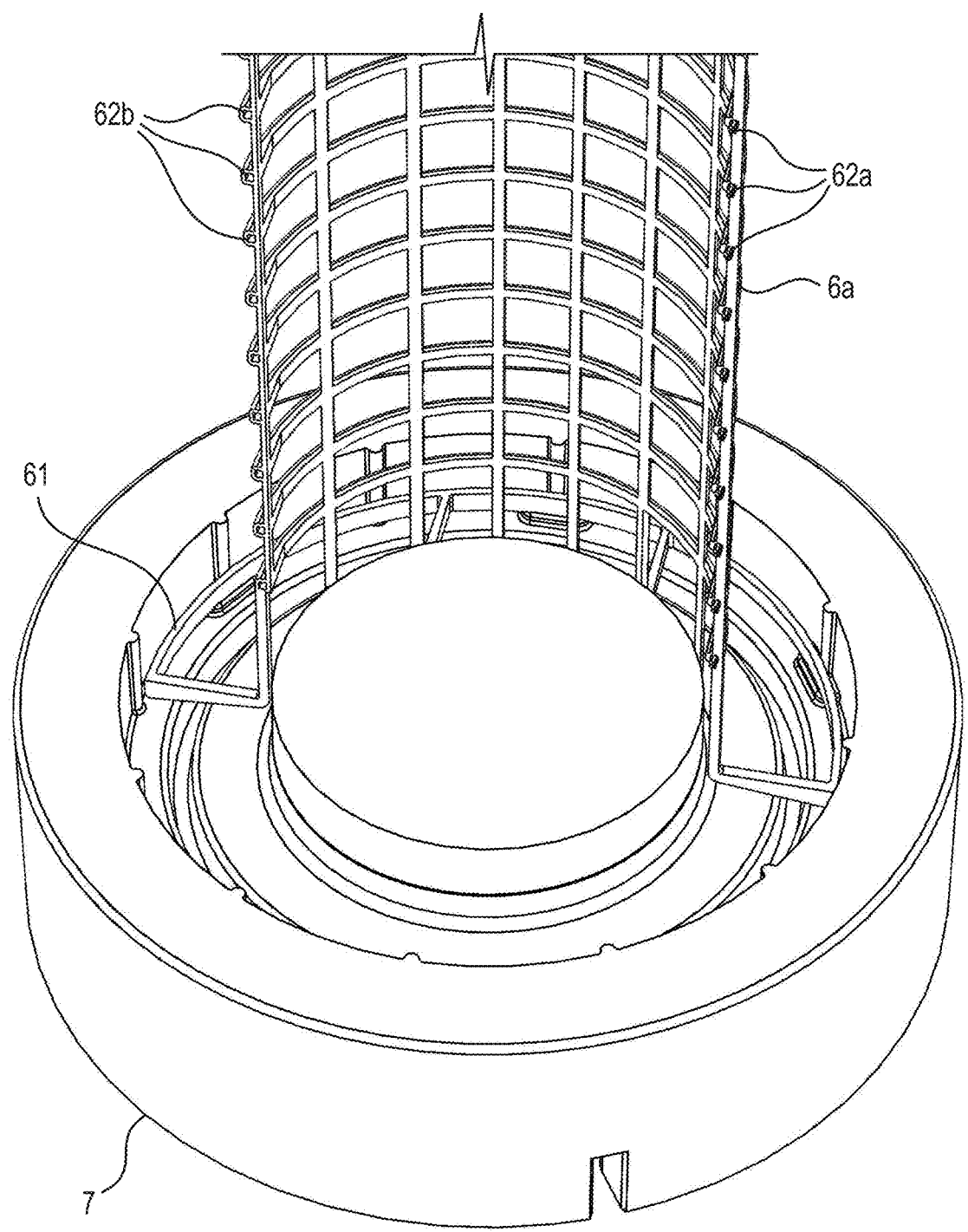
FIG. 12 is a view illustrating a partial inner screen installed in the mold during the manufacturing process.

FIGS. 10, 11 and 12 show a portion of the manufacturing process of the filter 1 that includes a mold 7 for the cold pour of the urethane to create the outlet air seal 5. As demonstrated from these figures, when the filter media 3 and screen assembly 6 are installed into the air outlet mold 7, the urethane is poured so as to flow into the open areas to secure firmly together the assembled inner and outer screens 6a and 6b, respectively and in combination, the filter media 3 and, if included, the FIR 2. In other words, the urethane seal 5, after being cured, holds all of the constituent parts together in an advantageously secure manner. FIG. 11 shows the outer screen 6b on the air outlet side sitting atop the lip 61 of the inner screen 6a, to ensure proper positioning of the filter media 3 in the mold 7. FIG. 12 shows the inner screen 6a alone positioned in the air outlet mold 7, and the urethane flows through all open areas in the inner screen 6a during the cold-pour process. Therefore, it should be understood that the urethane seal 5 shown in FIGS. 1 and 2 is merely diagrammatic. The actual structure of the urethane seal 5 is different, as seen in FIG. 9, due to the urethane flowing through and over the surfaces of the screen assembly 6, the media 3, and the FIR 2 if included, during manufacturing.

As shown in FIGS. 1, 2, and 9, the inner and outer plastic screens 6a and 6b are provided to the filter 1 and serve multiple functions. Both of the inner and outer screens 6a and 6b have a two-part design allowing for two halves to be joined in the manufacturing process and ultimately securely bonded at each end of the assembled filter 1. At one end, the screen assembly 6 is secured by the outlet air urethane seal 5, and at the other, non-outlet air end, the screen assembly 6 is glued into the filter end cap 4. Although glue is used in the present embodiment to attach the screen assembly 6 to the end cap 4, the disclosure is not limited to the use of glue. For example, the filter end cap 4 could also be bonded to the filter media 3 and screen assembly 6 using urethane, closed cell foam, epoxy, rubber, or any other bonding agent that would securely fasten the filter media 3 and screen assembly 6 to the end cap 4 without damaging the filter media 3.

When the two halves of the inner plastic screen 6a are joined, the two halves form the circular lip 61 on the urethane seal side of the filter 1, creating the fixture to hold and position the FIR 2 in place. The inner support lip 61, which protects the filter media 3 and supports the urethane seal 5, can be seen in FIGS. 1, 2 and 9. As understood from, for example, FIG. 9, the inner support lip 61 extends outward from the filter media 3 in a direction perpendicular to the longitudinal (axial) direction of the filter 1, such that the inner support lip 61 extends to a radial position corresponding to a radial position of the outer plastic screen 6b. This arrangement strengthens the filter outlet, preventing the urethane from rolling when installing and when removing the filter, and further provides the filter 1 with tolerance to extreme vibration and shock.

Figure 3:
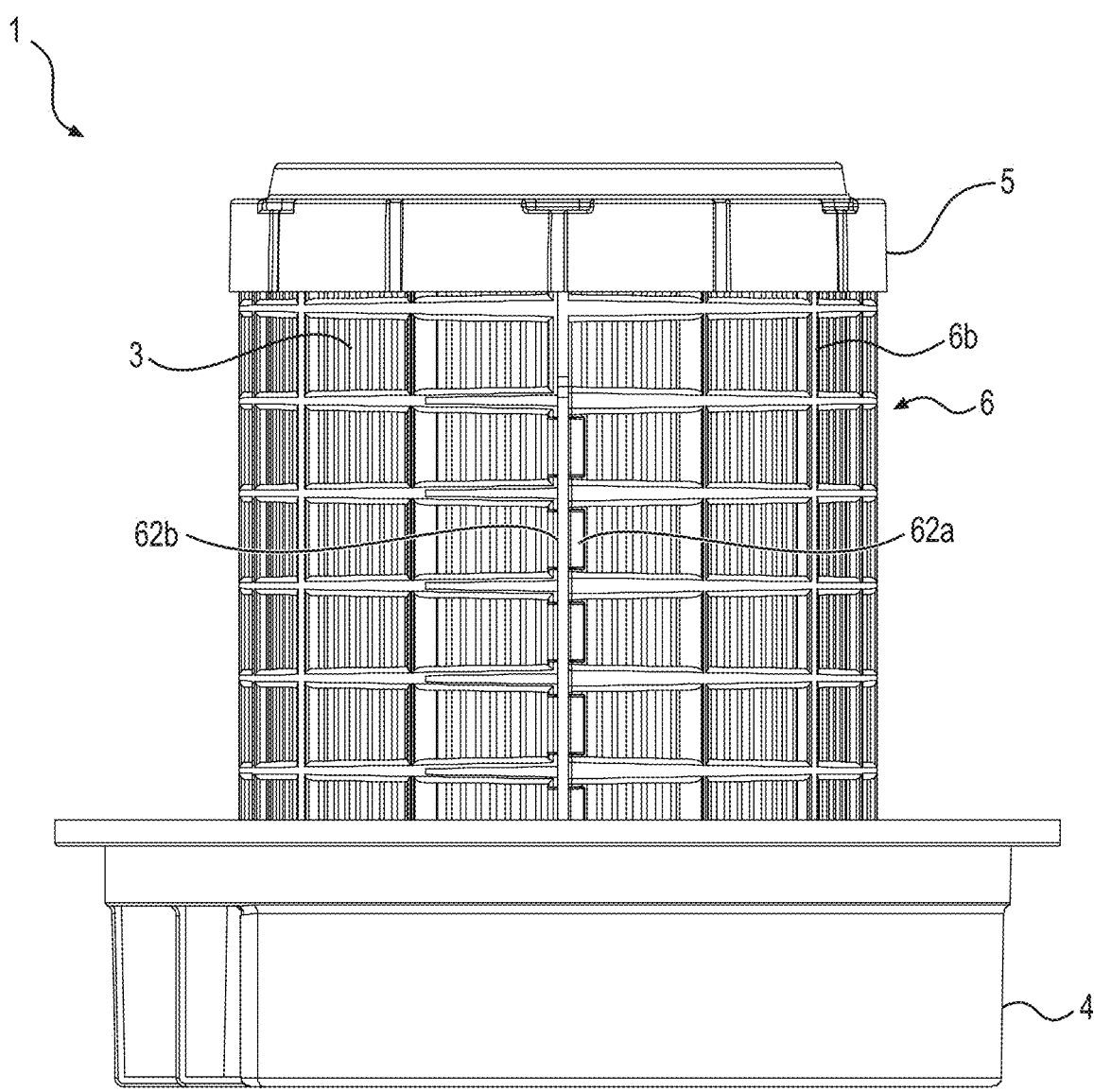
FIG. 3 is a view illustrating the assembled filter in a vertical configuration.

The plastic screen assembly 6 has a tolerance such that the screen assembly 6 fits securely in the manufacturing mold 7, ensuring the finished filter 1 has a true perpendicular fit of the filter media 3 to the inner and outer plastic screens 6a and 6b, which have a perpendicular fit to the filter end cap 4 as shown in FIG. 3. This ensures proper alignment of the filter 1 in the air filter housing so that both the inside of the outlet air seal 5 and the filter end cap 4 align and fit cleanly into and onto the filter housing as shown in FIG. 4, with no interference or damage to the filter media 3 during the installation process.

Figure 13:
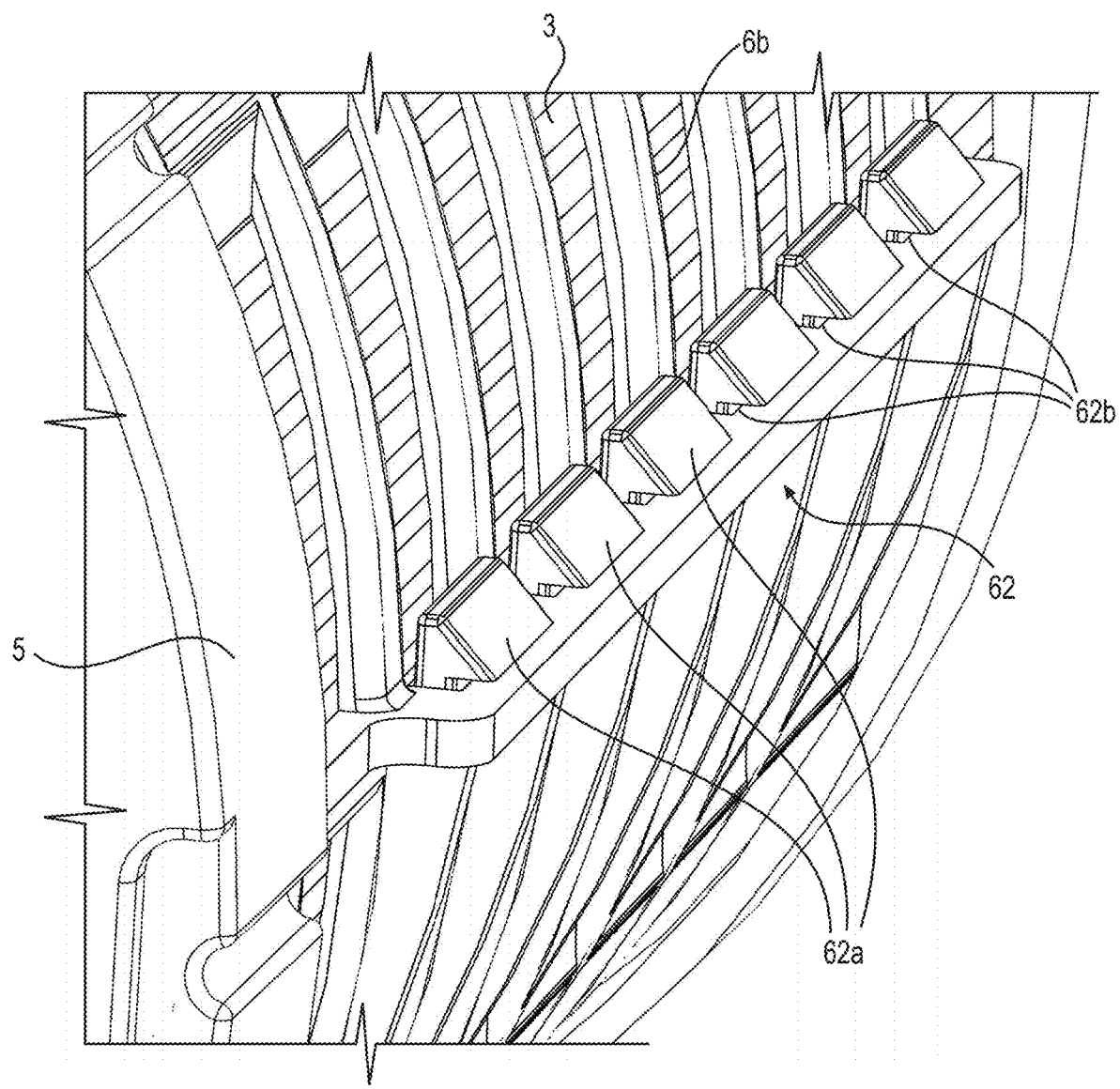
FIG. 13 is a view illustrating the latching mechanism of the screen assembly once assembled.
Figure 14:
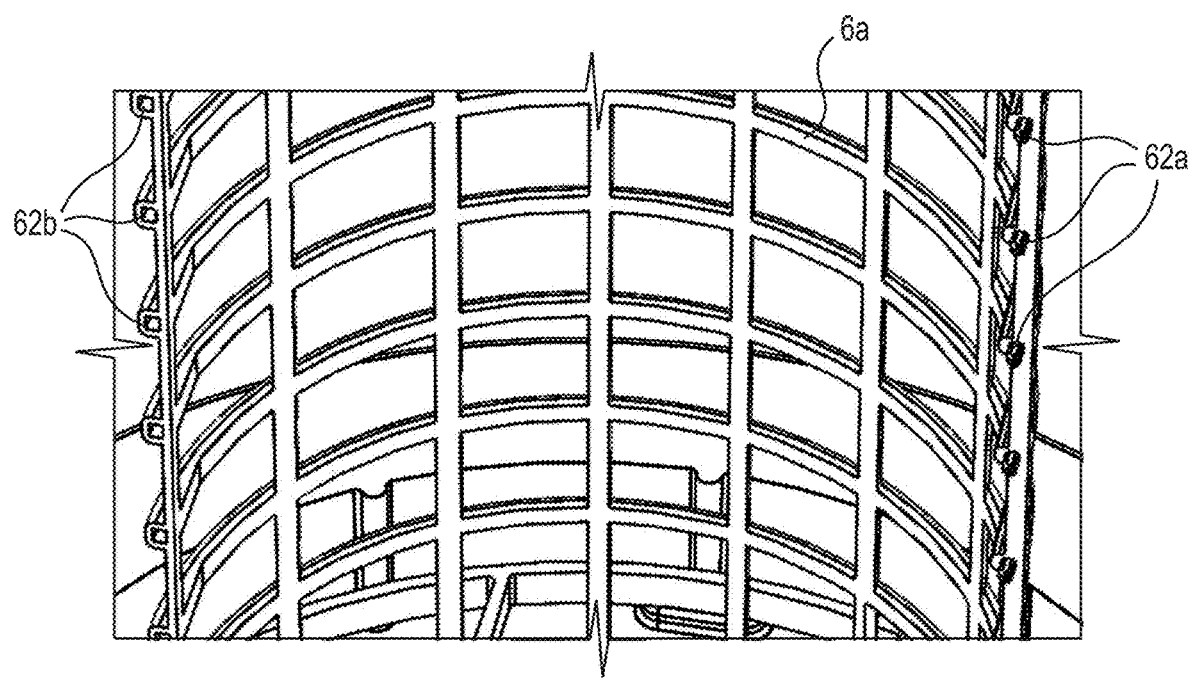
FIG. 14 is another view illustrating the latching mechanism of the screen assembly prior to being assembled.

The inner and outer plastic screens 6a and 6b (shown in FIGS. 1, 2, and 9) are held in place on both ends as discussed above. However, in the middle of the two screen halves, the screens 6a and 6b are held in place by a latch mechanism 62 (see FIGS. 1, 13 and 14) that provides alignment of the two halves of each screen 6a and 6b, respectively, and holds them together during and after the manufacturing process. More specifically, the latch mechanism 62 is comprised of a plurality of projections 62a on one side of each screen half, and a plurality of receiving slots 62b on the other side of each screen half. In FIG. 13, the projections 62a are shown inserted into the receiving slots 62b. In FIG. 14, the projections 62a and receiving slots 62b are shown separated (i.e., prior to assembly), with the projections 62a shown on the right side of FIG. 14 and the receiving slots 62b shown on the left side of FIG. 14.

Although the latch mechanism 62 is shown in the present embodiment, the screen halves may be attached by other means. For example, the screens 6a and 6b, respectively, may be rolled or may have a tongue and groove attachment mechanism.

The latch mechanism 62 provides resilience and shock absorption. If the filter 1 is dropped, energy is transferred to the latch mechanism 62 to protect the filter media 3. The latch mechanism 62 will flex such that the projections 62a and the receiving slots 62b move relative to each other without losing total connectivity. Due to this relative movement, the latch mechanism 62 is able to dissipate the energy without losing total connectivity and then return to the original position with the projections 62a latching against the receiving slots 62b.

The advantageous structural design of the filter 1 disclosed in this application embodies a combination of a cold-poured urethane seal 5, which has a higher durometer measurement than hot-cured urethane, with the plastic screen assembly 6 being constructed by joining a two-piece circular inner screen 6a and a two-piece circular outer screen 6b. The screen assembly 6 provides a plastic support structure that reinforces the urethane of the seal 5 and allows for extreme shock absorption without damaging the support structure of the filter 1 or performance of the filter media 3. This structure significantly increases the durability of the manufactured filter 1 when compared to a manufactured filter made with metal inner and outer screens. Metal screen filter designs can dent, distort and crumple when the filter is dropped or mishandled and may result in damage to the filter media. In contrast, the plastic inner and outer screens 6a and 6b of this disclosure do not negatively affect the filter media 3 if they come in contact with the filter media 3. Although in this embodiment the inner and outer screens 6a and 6b are made of plastic, they may be made of any material that provides the necessary support mechanism and features described above. For example, the inner and outer screens 6a and 6b may be made of a material other than plastic, such as metal screening, in a manner that does not result in damage to the media 3. Alternatively, instead of the inner and outer screens 6a and 6b, a dowel support with vertical rods may be provided. Alternatively, a self-contained filter, and/or the use of a stiff filter media, may be provided without any screens.

The flexibility of the urethane seal 5 and the inner and outer plastic screens 6a and 6b allows the filter seal to be maintained consistently, and reduces damage to the filter media 3 during installation, use and removal from the filter housing, as shown in FIG. 4. The shelf life of the filter 1 is also significantly improved with the configuration of the plastic inner and outer screens 6a and 6b, as compared to metal screens, which corrode over time.

The filter end caps 4, as shown in FIG. 8, all receive and share the same inner and outer screens 6a and 6b and filter media 3 in the manufacturing process. The sealing arrangement incorporates a close-tolerance, circular, raised centering lip 4a to accept the inner and outer plastic screens 6a and 6b and the filter media 3. The circular raised lip 4a of the filter end cap 4 is shown in FIG. 9. The circular raised lip 4a extends circumferentially and projects from the inner surface of the end cap 4 so as to enclose the inner and outer plastic screens 6a and 6b and the filter media 3. The circular raised lip 4a provides alignment allowing the glue to hold the inner and outer plastic screens 6a and 6b as well, as the filter media 3, perpendicular to, and centered in, the end cap 4 during manufacturing, as seen in FIG. 9.

This close-tolerance, raised, centering lip 4a is a characteristic of the end caps 4 shown in FIG. 8 as well as of future designs that might be required for other specific applications. As illustrated in FIG. 8, the outside of each filter end cap 4 can be configured for almost any application, with this illustration showing three different ejective-style end caps 4 to be used on self-cleaning airflow applications; and one standard, closed filter end cap 4 for use with recirculation airflow applications, which is referred to as a closed end cap. The three ejective style end caps 4 illustrated in FIG. 8 are referred to as a slotted end cap, a louvered end cap, and a ported end cap, respectively. These ejective style end caps allow debris to be ejected from the filter housing. These caps have an open orifice to the environment for ejecting material back to the environment though a construct that directs the debris away from the filter in a predetermined path. FIG. 8 shows plastic filter caps for the ejective style end caps, but the material is not limited to plastic and may, alternatively, include urethane, closed cell foam, or rubber. The closed end cap, by contrast, maintains a sealed environment for the precleaner apparatus and may be used in recirculation or filtration applications to avoid the separated debris from being ejected back into the environment that is being filtered. FIG. 8 again shows a plastic filter cap for the closed end cap, but the material is not limited to plastic and may, alternatively, include urethane, closed cell foam, or rubber.

FIGS. 5A to 5D show the complete filter 1 installed in the filter housing, which is held in place by the retaining clips that securely grab the outer surface of the filter end cap 4, which is shown in FIGS. 1 and 2. FIGS. 5B to 5D are close-up views of the portion encircled and indicated as "B" in FIG. 5A.

Figure 6:
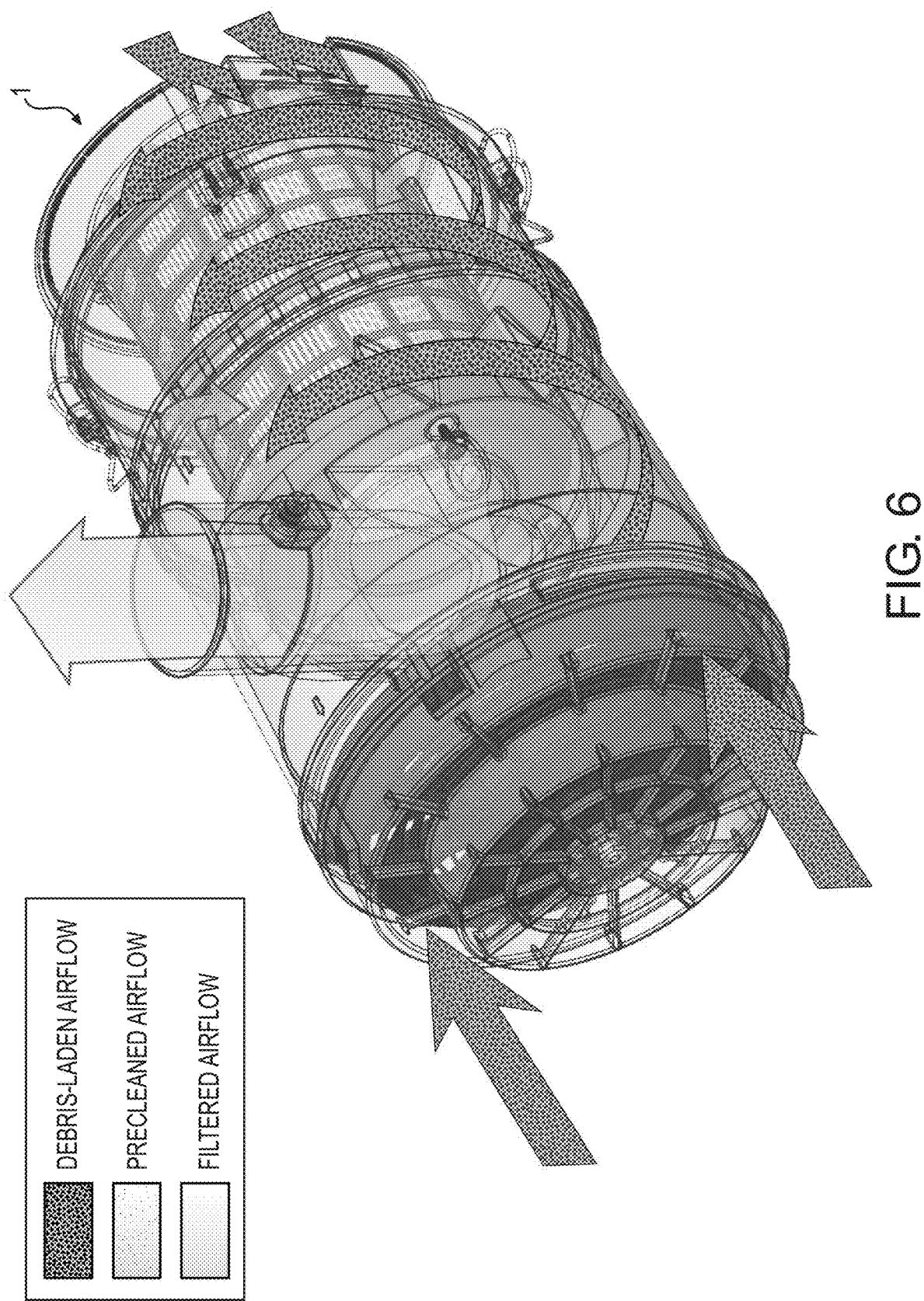
FIG. 6 is a view, in which the filter housing is transparent, illustrating airflow through the filter housing.
Figure 7:
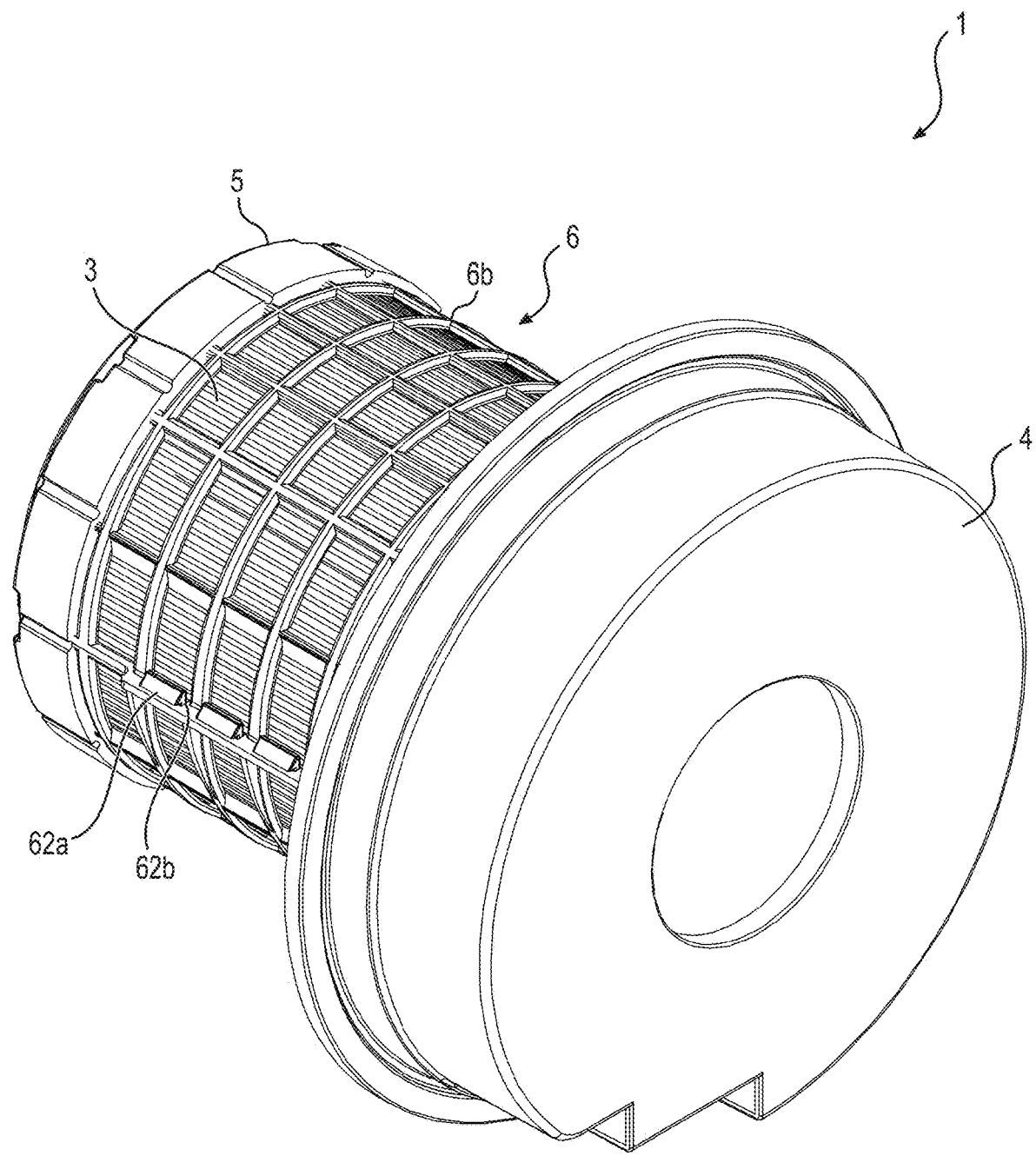
FIG. 7 is a view illustrating the assembled filter in a horizontal configuration.

FIG. 6 is a diagram illustrating three airflows within the filter housing in which the filter 1 is installed: debris-laden airflow, precleaned airflow, and filtered airflow. In FIG. 6, the large, open-area screen assembly 6 does not interfere with debris releasing off the surface of the filter 1; rather, the design allows the debris to be continuously released from the filter face and then re-enter the airstream around the filter 1 and to be ejected. FIG. 6 may be understood further with reference to U.S. Ser. No. 16/022,941, incorporated by reference above.

The filter structure of this disclosure allows for the use of a wide range of filter media and is ideally suited for advanced, high-efficiency media. For example, the filter media 3 may include a variety of media, including but not limited to, natural fiber or synthetic fiber media; may contain carbon wrap, carbon pellets, felt wrap or foam; or may be any media having high-efficiency and the features described above. The filter media 3 can be formed of a single media or of multiple media, including but not limited to the types of media mentioned above. The plastic screen assembly 6 is nonabrasive and non-corrosive, providing superior protection of the filter media 3 from vibration and corrosion. This filter structure can be comprised of recyclable plastic and natural fibers making it easily recyclable.

Exemplary embodiments of the present invention have been described above. It should be noted that the above exemplary embodiments are merely examples of the present invention and the present invention is not limited to the detailed embodiments. It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by this disclosure.

What is claimed is:

1. An air filter comprising:
a filter media;
an end cap secured to a first end of the filter media;
a urethane outlet air seal secured to a second, opposite end of the filter media; and
a screen assembly secured to a central portion of the filter media between the first and second ends, wherein
the screen assembly includes an inner screen and an outer screen, the inner screen being positioned inside of the filter media, the outer screen being positioned around an outer surface of the filter media,
the inner screen includes a circular lip positioned at the second end of the filter media, the circular lip being entirely embedded in the urethane outlet air seal and extending to a radial position corresponding to a radial position of the outer screen, and
the outer screen has a first outer screen half and a second outer screen half, the first and second outer screen halves being secured together by a latch mechanism.

2. The air filter according to claim 1, further comprising a filter identification component configured to record data of the air filter.

3. The air filter according to claim 2, wherein the filter identification component is embedded in the urethane outlet air seal.

4. The air filter according to claim 1, wherein the inner screen has a first inner screen half and a second inner screen half, the first and second inner screen halves being secured together by another latch mechanism.

5. The air filter according to claim 4, wherein the other latch mechanism includes a plurality of projections and a plurality of receiving slots configured to receive the projections to secure the first and second inner screen halves together.

6. The air filter according to claim 1, wherein the latch mechanism includes a plurality of projections and a plurality of receiving slots configured to receive the projections to secure the first and second outer screen halves together.

7. The air filter according to claim 3, wherein the circular lip is embedded in the urethane outlet air seal together with the filter identification component.

8. The air filter according to claim 1, wherein the urethane outlet air seal includes one or more recesses that receive the circular lip of the inner screen.

9. The air filter according to claim 7, wherein the urethane outlet air seal includes one or more recesses that receive the filter identification component and the circular lip of the inner screen.

10. The air filter according to claim 1, wherein the filter media is embedded in the urethane outlet air seal.

11. The air filter according to claim 7, wherein the filter media is embedded in the urethane outlet air seal together with the circular lip and the filter identification component.

12. The air filter according to claim 1, wherein the end cap is secured to the first end of the filter media with glue to form a non-outlet air end.

13. The air filter according to claim 1, wherein the screen assembly is made of plastic.

14. The air filter according to claim 1, wherein the end cap includes a raised centering lip inside of which the filter media and the screen assembly are positioned.

15. The air filter according to claim 5, wherein the other latch mechanism is configured to flex such that the projections and the receiving slots move relative to each other without losing total connectivity.

16. The air filter according to claim 6, wherein the latch mechanism is configured to flex such that the projections and the receiving slots move relative to each other without losing total connectivity.

17. An air precleaner comprising:
a filter housing; and
an air filter positioned inside of the filter housing, wherein the air filter includes
  a filter media;
  an end cap secured to a first end of the filter media to form a non-outlet air end of the filter housing;
  a urethane outlet air seal secured to a second, opposite end of the filter media; and
  a screen assembly secured to a central portion of the filter media between the first and second ends, wherein
the screen assembly includes an inner screen and an outer screen, the inner screen being positioned inside of the filter media, the outer screen being positioned around an outer surface of the filter media,
the inner screen includes a circular lip positioned at the second end of the filter media, the circular lip being entirely embedded in the urethane outlet air seal and extending to a radial position corresponding to a radial position of the outer screen, and
the outer screen has a first outer screen half and a second outer screen half, the first and second outer screen halves being secured together by a latch mechanism.

18. A method of manufacturing an air filter, the method comprising:
providing a mold;
positioning a filter media and a screen assembly in the mold, wherein the screen assembly includes an inner screen positioned inside of the filter media and an outer screen positioned around an outside surface of the filter media, and the outer screen has a first outer screen half and a second outer screen half, the first and second outer screen halves being secured together by a latch mechanism;
positioning the outer screen on a circular lip of the inner screen, wherein the circular lip is positioned at an end of the filter media and extends to a radial position corresponding to a radial position of the outer screen;
cold-pouring urethane into the mold such that the urethane flows into spaces between and within the filter media and the screen assembly; and
curing the urethane such that the filter media and the screen assembly are secured together and embedded at one end inside of a urethane outlet air seal formed by the cured urethane, and such that the circular lip is entirely embedded in the urethane outlet air seal.

19. An air filter comprising:
a filter media;
an end cap secured to a first end of the filter media;
a urethane outlet air seal secured to a second, opposite end of the filter media;
a screen assembly secured to a central portion of the filter media between the first and second ends; and
a filter identification component configured to record data of the air filter,
wherein the screen assembly includes an inner screen and an outer screen, the inner screen being positioned inside of the filter media, the outer screen being positioned around an outer surface of the filter media, the inner screen includes a circular lip positioned at the second end of the filter media, and
the circular lip is embedded in the urethane outlet air seal together with the filter media and the filter identification component, with the circular lip and the filter identification component being disposed inside different respective recesses of the urethane outlet air seal, each recess extending around an entire circumference of the urethane outlet air seal.

20. The air filter according to claim 19, wherein
the circular lip extends to a radial position corresponding to a radial position of the outer screen.

21. A method of manufacturing an air filter, the method comprising:
providing a mold;
positioning a filter media, a filter identification component configured to record data of the air filter, and a screen assembly in the mold, wherein the screen assembly includes an inner screen positioned inside of the filter media and an outer screen positioned around an outside surface of the filter media;
positioning the outer screen on a circular lip of the inner screen;
cold-pouring urethane into the mold such that the urethane flows into spaces between and within the filter media, the filter identification component, and the screen assembly; and
curing the urethane such that the filter media, the circular lip and the filter identification component are embedded together at one end inside of a urethane outlet air seal formed by the cured urethane, with the circular lip and the filter identification component being disposed inside different respective recesses of the urethane outlet air seal, each recess extending around an entire circumference of the urethane outlet air seal.

22. An air filter comprising:
a filter media;
an end cap secured to a first end of the filter media;
a urethane outlet air seal secured to a second, opposite end of the filter media; and
a screen assembly secured to a central portion of the filter media between the first and second ends, wherein
the screen assembly includes an inner screen and an outer screen, the inner screen being positioned inside of the filter media, the outer screen being positioned around an outer surface of the filter media,
the inner screen includes a circular lip positioned at the second end of the filter media, the circular lip being entirely embedded in the urethane outlet air seal and extending to a radial position corresponding to a radial position of the outer screen, and
the inner screen has a first inner screen half and a second inner screen half, the first and second inner screen halves being secured together by a latch mechanism.

* * * * *